US008222840B2

(12) United States Patent
Tanaka et al.

(10) Patent No.: US 8,222,840 B2
(45) Date of Patent: Jul. 17, 2012

(54) FUEL CELL MOUNT APPARATUS AND ELECTRIC POWER SUPPLY SYSTEM

(75) Inventors: Koichi Tanaka, Kanagawa (JP); Chiaki Kanai, Kanagawa (JP); Kazutoshi Nomoto, Kanagawa (JP); Yasuhiro Watanabe, Tokyo (JP); Yuichi Takai, Tokyo (JP)

(73) Assignee: Sony Corporation, Tokyo (JP)

( * ) Notice: Subject to any disclaimer, the term of this patent is extended or adjusted under 35 U.S.C. 154(b) by 945 days.

(21) Appl. No.: 10/537,523

(22) PCT Filed: Dec. 12, 2003

(86) PCT No.: PCT/JP03/15918
§ 371 (c)(1),
(2), (4) Date: Jul. 19, 2005

(87) PCT Pub. No.: WO2004/054020
PCT Pub. Date: Jun. 24, 2004

(65) Prior Publication Data
US 2006/0003216 A1    Jan. 5, 2006

(30) Foreign Application Priority Data

Dec. 12, 2002    (JP) ............................... P2002-361310

(51) Int. Cl.
*H02P 5/00* (2006.01)
*H02P 1/54* (2006.01)
*H02P 5/46* (2006.01)
*H02P 1/00* (2006.01)

(52) U.S. Cl. .............................. 318/98; 318/34; 318/139

(58) Field of Classification Search .................. None
See application file for complete search history.

(56) References Cited

U.S. PATENT DOCUMENTS
5,976,725 A * 11/1999 Gamo et al. .................... 429/25
(Continued)

FOREIGN PATENT DOCUMENTS
EP    1225082    7/2002
(Continued)

OTHER PUBLICATIONS
Japanese Office Action dated Apr. 26, 2011 for corresponding Japanese Patent Application No. 2007-261813.

*Primary Examiner* — Barbara Gilliam
*Assistant Examiner* — Steven Scully
(74) *Attorney, Agent, or Firm* — K&L Gates LLP

(57) ABSTRACT

A fuel cell mount apparatus includes: a fuel cell system including a power generation unit for generating electric power by use of a fuel and air, a hydrogen occlusion cylinder for supplying the fuel to the power generation unit, an air supply means for supplying air to the power generation unit, and a control unit for controlling the power generating operation of the power generation unit; and a dog type robot mounted with the fuel cell system and operated by electric power outputted from the fuel cell, wherein a part of component elements of the fuel cell system and a part of component elements of the dog type robot are used in common with each other, i.e., one of the component elements functions also as the other of the component elements, whereby a component element can be made to function as both a part of an electronic apparatus and a part of the fuel cell, the wastefulness of component elements can be removed, and the fuel cell can be efficiently mounted on various electronic apparatuses.

12 Claims, 5 Drawing Sheets

U.S. PATENT DOCUMENTS

| | | | |
|---|---|---|---|
| 6,330,494 B1 * | 12/2001 | Yamamoto | 700/261 |
| 6,421,585 B1 * | 7/2002 | Takamura | 700/245 |
| 6,522,096 B1 * | 2/2003 | Roth | 310/156.01 |
| 2002/0011335 A1 * | 1/2002 | Zhang et al. | 166/335 |
| 2003/0129459 A1 * | 7/2003 | Ovshinsky et al. | 429/9 |
| 2005/0019629 A1 * | 1/2005 | Ikuma et al. | 429/23 |

FOREIGN PATENT DOCUMENTS

| | | |
|---|---|---|
| EP | 1331679 | 7/2003 |
| JP | 9213359 | 8/1997 |
| JP | 10285800 | 10/1998 |
| JP | 11-329457 | 11/1999 |
| JP | 2001-229945 | 8/2001 |
| JP | 2001229943 | 8/2001 |
| JP | 2001349681 | 12/2001 |
| JP | 2002059389 | 2/2002 |
| JP | 2002110187 | 4/2002 |
| JP | 2002203584 | 7/2002 |
| JP | 2002237321 | 8/2002 |
| JP | 2002-280035 | 9/2002 |
| JP | 2003118697 | 4/2003 |
| WO | WO01/32366 * | 5/2001 |

* cited by examiner ated type VTR (Video Tape Recorder), a personal digital aid (PDA), etc., and particularly to a fuel cell mount apparatus in which at least part of component parts of an electronic apparatus and component parts of a fuel cell is used in common. In addition, the present invention relates to a fuel cell mount apparatus in which a secondary cell or the like capable of supplying required electric power even in the case of a large variation in load is provided separately from a fuel cell. Furthermore, the present invention relates to an electric power supply system capable of stable power supply even in the case of a large variation in load by use of a secondary cell or the like provided separately from a fuel cell.
FUEL CELL MOUNT APPARATUS AND ELECTRIC POWER SUPPLY SYSTEM

CROSS REFERENCE TO RELATED APPLICATION

The present application claims priority to Japanese Patent Document No. P2002-361310 filed on Dec. 12, 2002, the disclosure of which is herein incorporated by reference.

BACKGROUND

The present invention relates to a fuel cell mount apparatus with a fuel cell mounted thereon as a power supply for an electronic apparatus such as, for example, a robot apparatus, an articulated robot, a notebook type personal computer, a cellular phone, a camera-integr As this type of fuel cell mount apparatus, heretofore, there has been known, for example, that which is configured as shown in FIG. 6 (see, for example, Japanese Patent Laid-open No. Hei 9-213359, pp. 3-4, FIGS. 1 and 2). FIG. 6 shows a notebook type personal computer 1 in which a small, solid state type fuel cell using hydrogen as a fuel and air as an oxidizing agent is used as a portable power supply.

The notebook type personal computer 1 is composed of a personal computer main body 3 with a keyboard console unit 2 disposed at its upper surface, and a lid body 5 with a liquid crystal display 4 mounted at its lower surface. The personal computer main body 3 and the lid body 5 are linked on the back side by hinges so that they can be turned freely and be fixed at arbitrary positions. With the lid 5 closed and laid on the personal computer main body 3, the liquid crystal display 4 is laid on the keyboard console unit 2 so that they are covered by each other. A cell containing portion 6 is provided at a side surface of the personal computer main body 3, and a fuel cell 7 as a portable power supply is removably mounted in the cell containing portion 6 to be used.

The fuel cell 7 includes a power generation unit 8 for generating electric power by use of a fuel (hydrogen) and air (oxygen), a hydrogen storage cylinder 9 for supplying the power generation unit 8 with stored hydrogen in a predetermined quantity, an air supply means 10 for supplying air to the power generation unit 8, a control unit 11 for controlling the power generating operation of the power generation unit 8, a cell case 12 for containing these components integrally, and the like. The cell case 12 is provided with an intake port 13 and an exhaust port 14 for air, and a connection unit 15 for electrical connection between the personal computer main body 3 and the fuel cell 7. Besides, a fan as a specific example of the air supply means 10 is disposed on the inside of the intake port 13 of the cell case 12.

Besides, as the above-mentioned related-art fuel cell mount apparatus, there has been, for example, that which is described in Japanese Patent Laid-open No. 2002-59389. This reference (refer, particularly, to pp. 3-4 and FIGS. 1 and 2) describes an autonomous walking robot apparatus composed of a robot in which, based on detection signals from sensors for outputting the detection signals by detecting the external atmosphere, an actuator unit causes a plurality of drive units to perform autonomous operations corresponding to the detection signals, and a battery charger for the robot.

In the autonomous walking robot apparatus, at the time of charging the battery of the robot, the actuator drives the fore-legs and hind-legs with a walking guide signal transmitted from the battery charger in response to a battery charging demand signal from an antenna unit, the robot approaches the battery charger, then, the fore-legs, the hind-legs, a mouth part and a tail part are driven based on a peripheral environmental map formed by detection of land marks by an external field image pickup sensor, the robot is disposed in a battery charging pose relative to the battery charger, and the battery is charged. At the time of completion of the battery charging, a battery charging stop demand signal is sent from the antenna unit, the operation of the battery charger is stopped, and the robot is released from the battery charger. Thus, the battery charging is naturally performed as an amusement operation for the tired robot to rest in the battery charging position, and the user can enjoy an amusement even during the battery charging.

However, in the related-art fuel cell mount apparatuses as above-mentioned, in the case of the former one, the notebook type personal computer 1 is provided with the control unit including a microcomputer or the like for performing a predetermined control based on the information inputted from the keyboard console unit 2 and the like, and, separately from this control unit, a control unit 11 for controlling the power generation unit 8 and the like is separately and independently provided also in the fuel cell 7. Further, the notebook type personal computer 1 and the fuel cell 7 each include heat-generating component element such as the control unit and a motor, and, therefore, they are each separately and independently provided with a fan, a pump, a cooler and the like for cooling the heat-generating parts. The situations of the component elements, environmental conditions and the like apply also to the case of the latter one, namely, the autonomous walking robot apparatus.

Therefore, a plurality of the same component parts used for a common purpose are provided in one fuel cell mount apparatus. Therefore, there has been the problem that the number of component parts is large, the apparatus as a whole is complicated, and the apparatus is uneconomical.

Furthermore, in the above-mentioned fuel cell mount apparatus, where the drive units of the electronic apparatus are supplied with electric power from one fuel cell, the electric power consumed in a specific drive unit may be abruptly increased to exceed the upper limit of the electric power amount which can be supplied from the fuel cell. When the upper limit of the electric power amount which can be supplied from the fuel cell is thus exceeded, a trouble would be generated in power generation in the fuel cell, resulting in that the driving of the fuel cell mount apparatus as a whole cannot be achieved satisfactorily. Particularly, the control unit including a CPU (Central Processing Unit) tends to show a larger load variation than those of the motor and the actuator unit.

SUMMARY

A fuel cell mount apparatus according to the present invention is a fuel cell mount apparatus including: a fuel cell capable of power generation by use of a fuel and air; and an electronic apparatus having the fuel cell mounted thereon and being operated by electric power outputted from the fuel cell; wherein the fuel cell mount apparatus has a common part used in common for the fuel cell and the electronic apparatus. According to the fuel cell mount apparatus of the present invention, a common part is used in common for the electronic apparatus and the fuel cell, whereby it is possible to remove wastefulness of the component parts, and to contrive simplification of structure, a reduction in size and a reduction in weight, of the apparatus as a whole.

The present invention achieves common use of part of component elements of an electronic apparatus and component elements of a fuel cell, to thereby remove wastefulness of the component elements, and enable efficient mounting of the fuel cell on a variety of electronic apparatuses. In the case where parts needing electric power are dispersed in an application structure, generation units of the fuel cell on the basis of the individual parts are dispersedly laid out, thereby to reduce the output of each of the power generation units, and to facilitate heat management, water management and the like. A stable supply of electric power can be provided even where a load variation is generated.

In the fuel cell mount apparatus according to the present invention, the common part may be a component element of the fuel cell and a component element of the electronic apparatus. The common use of a component element of the fuel cell and a component element of the electronic apparatus makes it possible to reduce the number of component parts in the fuel cell mount apparatus as a whole.

In the fuel cell mount apparatus according to the present invention, the common part may be a fan, a pump or a cooler used for cooling a power generation unit, a control unit or the like of the fuel cell, an auxiliary apparatus such as a heater and an electric heater used for heating a fuel supply means for supplying the fuel to the power generation unit of the fuel cell, an air supply means for supplying air to the power generation unit or the like, a temperature sensor, a humidity sensor, a radiator, a DC/DC converter, or the control unit. The auxiliary apparatus such as a fan and a pump or a microcomputer or the like in the control unit can be applied as the component part for common use in the fuel cell and the electronic apparatus, whereby it is possible to contrive a reduction in the number of these kinds of component parts.

Besides, in the fuel cell mount apparatus according to the present invention, the electronic apparatus may have a plurality of drive units needing electric power, the fuel cell may have a plurality of power generation units, and the plurality of power generation units may be in charge of electric power supply to the plurality of drive units. According to such a fuel cell mount apparatus, the plurality of power generation units are in charge of electric power supply to the drive units, whereby the output in each of the power generation units can be reduced, and the burden at the time of power generation in each power generation unit can be alleviated. With the burden on each power generation unit thus alleviated, it is possible to easily manage the temperature and water in each power generation unit, and to stably generate electric power.

Further, such a fuel cell mount apparatus may include an electric power supply means for supplying electric power to a predetermined drive unit of the plurality of drive units, and, further, the predetermined drive unit may have a larger load variation than those of the other drive units of the plurality of drive units, so that it is possible to stably supply electric power to drive units differing in load variation. In addition, the electric power supply means may be a secondary cell, a capacitor, or a combination thereof.

Besides, in the fuel cell mount apparatus according to the present invention, the electronic apparatus may have a plurality of drive units needing electric power, the fuel cell may have the power generation units as the number of the plurality of drive units, the power generation units may be disposed respectively in the vicinity of the drive units, and the drive units may be supplied with electric power respectively from the corresponding power generation units, whereby it is possible to reduce the output in each power generation unit, to alleviate the power generation burden on each power generation unit, and to further facilitate heat management and water management.

A fuel cell mount apparatus according to the present invention is a fuel cell mount apparatus including: a fuel cell capable of power generation by use of a fuel and air; and an electronic apparatus having the fuel cell mounted thereon and being operated by electric power outputted from the fuel cell; wherein the electronic apparatus has a plurality of drive units needing electric power, the fuel cell has a plurality of power generation units, and the plurality of power generation units are in charge of electric power supply to the plurality of drive units. According to the fuel cell mount apparatus of the present invention, electric power can be supplied from the electric power supply means even in the case where the output of the power generation units of the fuel cell does not follow up to the load variation in the drive units.

A fuel cell mount apparatus according to the present invention is a fuel cell mount apparatus including: a fuel cell capable of power generation by use of a fuel and air; an electric power supply means; and an electronic apparatus having the fuel cell and the electric power supply unit mounted thereon and being operated by electric power outputted from the fuel cell and the electric power supply means; wherein the electronic apparatus has a plurality of drive units needing electric power, and a power generation unit of the fuel cell and the electric power supply means are in charge of electric power supply to the plurality of drive units. According to the fuel cell mount apparatus of the present invention, even in the case where the output of a power generation unit in a fuel cell does not follow up to a load variation in a drive unit, the drive unit can be supplied with electric power from an electric power supply means An electric power supply system according to the present invention includes: a fuel cell for supplying electric power to a predetermined drive unit of a plurality of drive units; and an electric power supply means for supplying electric power to another drive unit or units having a larger load variation than that of the predetermined drive unit. According to the electric power supply system of the present invention, the drive unit supplied with electric power from the electric power supply means and the drive unit supplied with electric power from the fuel cell are discriminated by the magnitude of load variation, whereby the electric power required for the operation of each drive unit can be stably supplied, and the system supplied with electric power from the electric power supply system can be operated stably.

Additional features and advantages of the present invention are described in, and will be apparent from, the following Detailed Description and the figures.

DETAILED DESCRIPTION

Now, some embodiments of the present invention will be described below referring to the accompanying drawings.

First Embodiment

Figure 1:
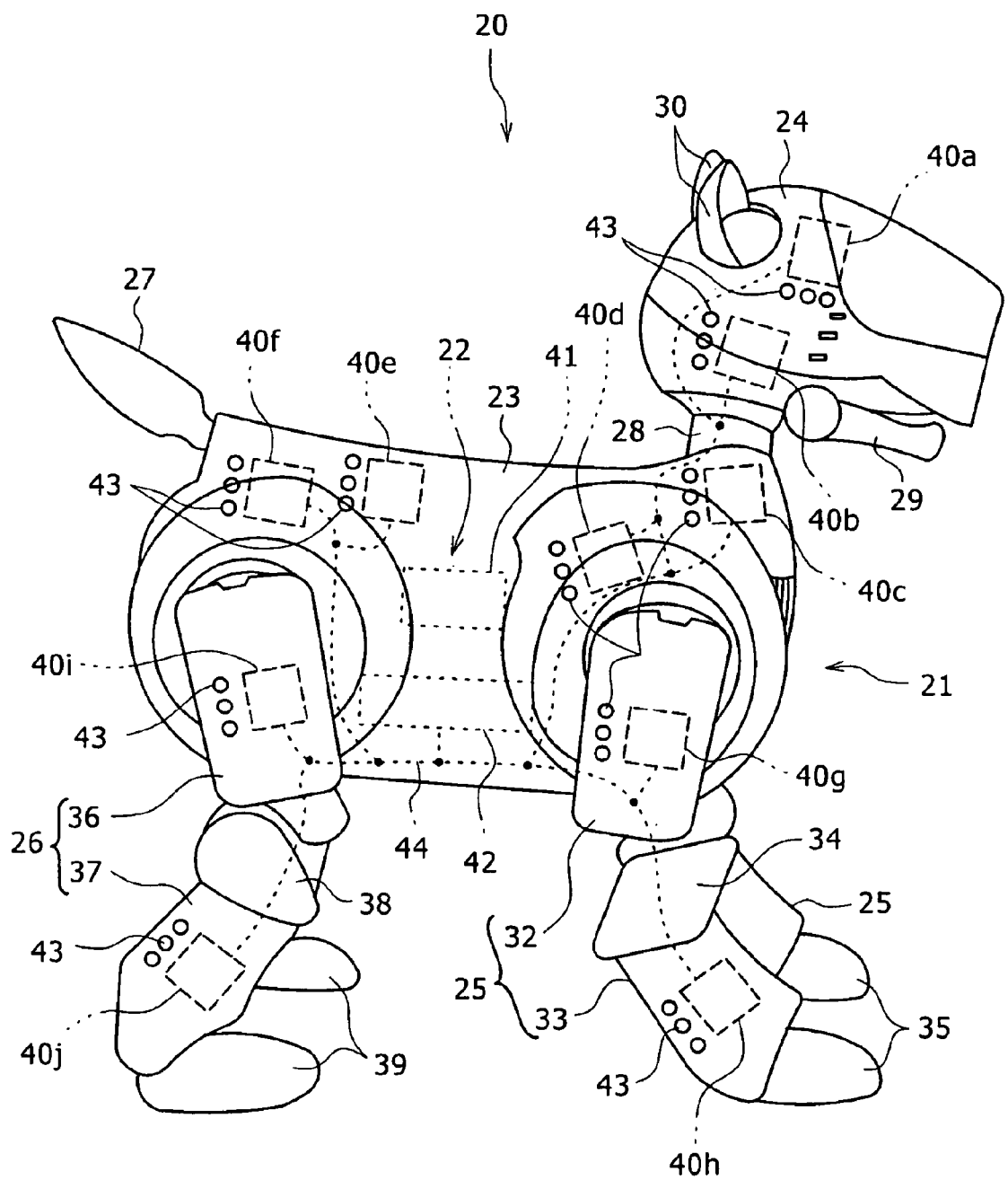
FIG. 1 shows a fuel cell mount apparatus according to a first embodiment of the present invention, illustrating the condition where a fuel cell system is mounted on a dog type robot.
Figure 2:
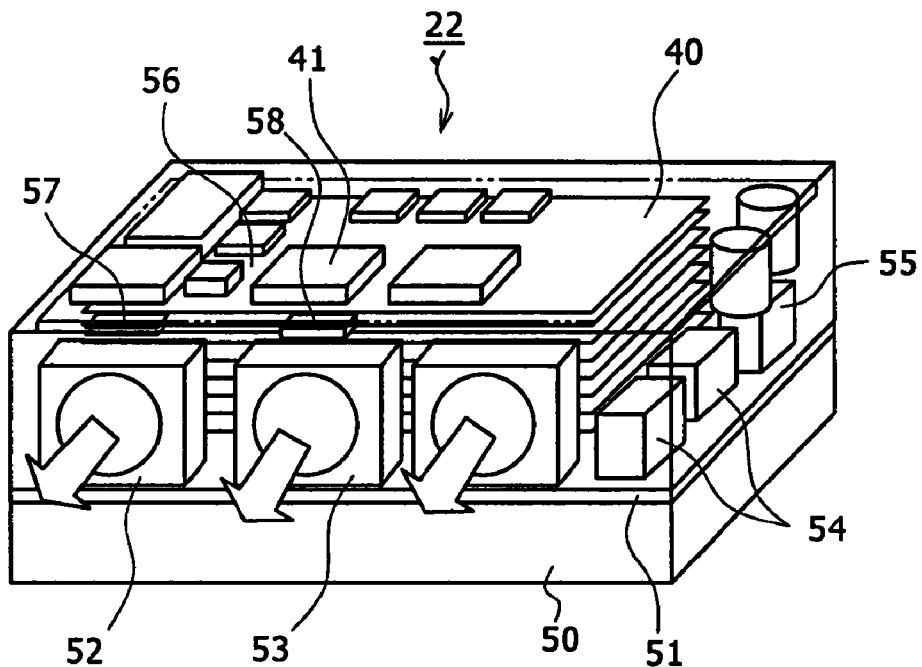
FIG. 2 illustrates one example of a fuel cell system pertaining to the fuel cell mount apparatus according to the first embodiment of the present invention.
Figure 3:
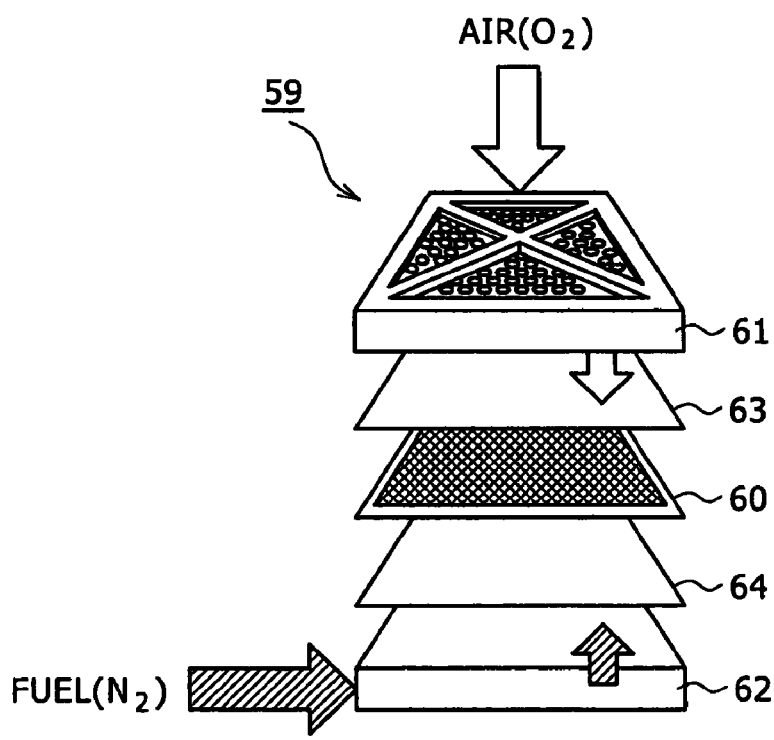
FIG. 3 illustrates a power generation cell of the fuel cell mounted on the fuel cell mount apparatus according to the first embodiment of the present invention.

FIGS. 1 to 3 show one embodiment of the present invention. FIG. 1 illustrates a general configuration of one embodiment of a fuel cell mount apparatus according to the present invention, FIG. 2 illustrates the principle of a fuel cell pertaining to the fuel cell mount apparatus of the present invention, and FIG. 3 illustrates one embodiment of the fuel cell pertaining to the fuel cell mount apparatus according to the present invention.

The fuel cell mount apparatus 20 showing one embodiment of the present invention has a configuration in which a dog type robot 21 as an electronic pet is used as an electronic apparatus and a fuel cell system 22 is mounted thereon. The dog type robot 21 is composed of a body portion 23 having a roughly drum-like shape, a head portion 24 mounted to a front upper portion of the body portion 23, two fore-leg portions 25 mounted to both side portions of a front portion of the body portion 23, two hind-leg portions 26 mounted to both side portions of a rear portion of the body portion 23, and a tail portion 27 mounted to a rear upper portion of the body portion 23.

The head portion 24 of the dog type robot 21 is provided with a neck portion 28 projected downwards, and the neck portion 28 is mounted to the body portion 23 through a neck joint so that it can be freely turned, lowered and raised in the vertical direction and the left-right direction within predetermined ranges. Further, a chin portion 29 is mounted to a lower portion of the neck portion 28 through a chin joint so that it can be freely lowered and raised in the vertical direction. Besides, a pair of ear portions 30, 30 are mounted to rear upper portions of the neck portion 28 through ear joints so that they are substantially symmetric on the left and right sides and can be freely turned.

In addition, the pair of fore-leg portions 25, 25, the pair of hind-leg portions 26, 26 and the tail portion 27 are linked respectively through the pair of fore-leg joints, the pair of hind-leg joints and the tail joint so that they can be freely turned, lowered and raised. Further, the pair of fore-leg portions 25, 25 are each composed of a leg upper portion 32 and a leg lower portion 33, which are linked through a front knee joint 34 so that they can be freely turned, lowered and raised. Besides, a fore-foot portion 35 is mounted to a tip end portion of the lower leg portion 33 through an ankle joint so that it can be freely lowered and raised.

Similarly, the pair of hind-leg portions 26, 26 are each composed of a leg upper portion 36 and a leg lower portion 37, which are linked through a rear knee joint 38 so that they can be freely turned, lowered and raised. Besides, a hind-foot portion 39 is mounted to a tip end portion of the lower leg portion 37 through an ankle joint so that it can be freely lowered and raised. Furthermore, the tail portion 27 is mounted to the body portion 23 through a tail joint so that it can be turned freely.

Each of the joint portions represents one specific example of the drive unit of the dog type robot 21 showing one embodiment of the electronic apparatus. One or two drive motors for turning or lowering or raising each joint portion are individually mounted respectively in each of the joint portions. In addition, an electronic apparatus control unit composed of a microcomputer, storage devices (RAM, ROM) and the like for drivingly controlling all the drive motors, various sensors, a voice recognition device and other mechanisms is incorporated in the body portion 23. All the drive motors are drivingly controlled by the electronic apparatus control unit, whereby the dog type robot 21 can be made to perform a walking motion, or various motions such as the motions in response to the order "Hand!", "Sit!" or the like.

In addition, the fuel cell system 22 is composed of the same number of power generation units 40 as the number of the above-mentioned joints provided for each of the joints, a fuel cell control unit 41 for controlling the power generating operations of all the power generation units 40, a fuel supply means 42 for supplying a fuel (hydrogen, methanol, methane or the like) to all the power generation units 40, and air supply means 43 for supplying air (oxygen) to each of the power generation units 40. Besides, the fuel used for the power generating reaction is not limited to a gas such as hydrogen gas but may naturally be a liquid such as methanol. Incidentally, a configuration may be adopted in which auxiliary apparatuses or the like such as cooling fans for cooling such heat generating sources as the power generation units 40 and the control unit are provided. In addition, the common part used in common for both the fuel cell system 22 and the dog type robot 21 provided as an electronic apparatus is a component element of the fuel cell system 22 or a component element of the dog type robot 21 provided as an electronic apparatus, and, by use of the component element in common, the number of component parts of the fuel cell mount apparatus 20 can be reduced. Besides, the common part may be any one that can be used in common, such as, for example, an auxiliary apparatus or the like such as a cooling fan, a pump and a cooler for cooling the above-mentioned control unit or other heat generating source, an auxiliary apparatus such as a heater and an electric heater used for heating the fuel supply means for supplying the fuel to the power generation units 40, the air supply means for supplying air to the power generation units, or the like, a temperature sensor, a humidity sensor, a radiator, a DC/DC converter, etc. In addition, a structural member of the fuel cell mount apparatus, such as a casing for containing the electronic apparatus or the fuel cell, may be used as the common part; where a wall surface portion of the casing is utilized for clamping the power generation unit of the fuel cell, the wall surface portion may be used as the common part. Furthermore, a fastening member in the power generation units having a stack structure may be used as the common part.

The same number of the power generation units 40 (40a to 40j) as the number of the joints provided on the basis of each of the joints are laid out respectively in the vicinity of the corresponding joints. Specifically, a power generation unit 40a for the ear portions 30 and a power generation unit 40b for the chin portion 29 are provided in the head portion 24. In addition, a power generation unit 40c for the neck portion 28, a power generation unit 40d for the fore-leg portions 25, a power generation unit 40e for the hind-leg portions 26, and a power generation unit 40f for the tail portion 27 are provided in the body portion 23.

Further, a power generation unit 40g for the fore-knee joint 34 is disposed in the leg upper portion 32 of the fore-leg portion 25, and a power generation unit 40h for the fore-foot portion 35 is disposed in the leg lower portion 33 of the fore-leg portion 25. Besides, a power generation unit 40i for the hind-knee joint 38 is disposed in the leg upper portion 36 of the hind-leg portion 26, and a power generation unit 40j for the hind-foot portion 39 is disposed in the leg lower portion 37 of the hind-leg portion 26. These power generation units 40a to 40j are connected to the fuel supply means 42 through a fuel piping 44, whereby they can be supplied with the fuel.

In addition, the air supply means 43 as specific examples of the air supply means are provided respectively in the vicinity of the body portion 23, the head portion 24 and the fore-leg and hind-leg portions 25, 26, in correspondence with the power generation units 40a to 40j. Air introduced from these air supply means 43 is served to power generation, together with hydrogen, in each of the power generation units 40a to 40j. As a specific example of the fuel supply means 42, there may be used, for example, a hydrogen storage cylinder capable of storing a large amount of hydrogen therein.

A general configuration of such a fuel cell system 22 is schematically shown in FIG. 2. In FIG. 2, symbol 50 denotes a fuel cartridge filled with a fuel gas, and is composed of a tetragonal flat box body. A base substrate 51 is mounted on the upper surface of the fuel cartridge 50; the power generation units 40, the cooling fan 52, two drying fans 53 for drying water generated in the power generation units 40, two on-off valves 54 for opening and closing fuel supply ports so as to regulate the flow rates of the fuel fed from the fuel cartridge 50 to the power generation units 40, a regulator 55 for compensating for variations in current and voltage taken out from the power generation units 40, and the like are mounted on the upper surface of the base substrate 51.

In addition, cooling fins 56 for radiating the heat of the power generation units 40 to cool the power generation units 40 are mounted on the upper surface of the power generation units 40. A plurality of large scale semiconductor integrated circuits (LSIs) and other control component parts for constituting the control unit 41, a temperature sensor 57, and a humidity sensor 58 are mounted on the cooling fins 56.

Besides, as a power generation cell constituting the power generation unit 40, there can be applied, for example, one that is configured as shown in FIG. 3. The power generation cell 59 shown in FIG. 3 is composed of a polymer electrolyte membrane electrode joint body 60 provided with catalyst layers on both sides thereof, an air-side separator 61 disposed on one side of the polymer electrolyte membrane electrode joint body 60, a fuel-side separator 62 disposed on the other side of the polymer electrolyte membrane electrode joint body 60, an air-side electrode 63 interposed between the air-side separator 61 and the polymer electrolyte membrane electrode joint body 60, and a fuel-side electrode 64 interposed between the fuel-side separator 62 and the polymer electrolyte membrane electrode joint body 60.

In the power generation cell 59 configured in this manner, power generation is performed, for example, as follows. First, hydrogen gas as a fuel is supplied to the fuel-side separator 62, while air as an oxidizing agent is supplied from the atmosphere to the air-side separator 61. As a result, the hydrogen gas (H2) makes contact with the fuel-side catalyst of the polymer electrolyte membrane electrode joint body 60, upon which electrons (e−) fly out and protons (H+) are generated (H2→2H++2 e−).

The protons (H+) pass through the polymer electrolyte membrane electrode joint body 60 toward the opposite side, namely, the side of the air-side electrode 63. On the side of the air-side electrode 63, oxygen (O2) in the air fed there reacts with the protons (H+) and the electrons (e−) having returned there after finishing the work, under the activity of the air-side catalyst on the polymer electrolyte membrane electrode joint body 60, to produce water (O2+4H++4 e−→2H2O).

The electrons (e−) generated upon this chemical reaction are collected at electrodes 63, 64, whereby electricity can be produced in the power generation cell 59. In the embodiment shown in FIG. 1, such power generation units 40 are provided respectively in the vicinity of the joint portions needing electric power, and electric power is produced according to the need on the basis of each joint portion. Therefore, the output of each power generation cell can be restrained to a lower level, as compared with the related-art system in which electricity is produced in one power generation unit and the electric power is supplied to all joint portions, and, therefore, power generation efficiency can be enhanced.

Moreover, since the output of each power generation cell is small, it is possible to facilitate heat management and water management at each power generation cell, and the system configuration can be simplified. Further, where a part of the component elements of the fuel cell system 22 and a part of the component elements of the dog type robot 21, for example, the control unit is used in common, it is possible to remove the wastefulness of the component elements in the fuel cell mount apparatus 20 as a whole, and to contrive simplification of the configuration.

Incidentally, of the component elements of the fuel cell system 22, the one that can be used in common as a component element of the dog type robot 21 is not limited to the above-mentioned control unit but may be any one, for example, the cooling fan 52, the drying fan or other component element that is used in common for both the fuel cell system 22 and the animal robot or the like.

The present invention is not limited to the above-described embodiment. While an example applied to the dog type robot functioning as an electronic apparatus has been described in the above embodiment, the present invention is applicable not only to other shapes or types of robots which are electronic apparatuses capable of moving by themselves but also electronic apparatuses which are incapable of moving by themselves, for example, notebook type personal computers, cellular phones and other electronic apparatuses. In addition, the configuration of the power generation cell is also not limited to that in the above-described embodiment. Thus, the present invention can be modified in a variety of ways within the scope of the gist of the invention.

Second Embodiment

Figure 4:
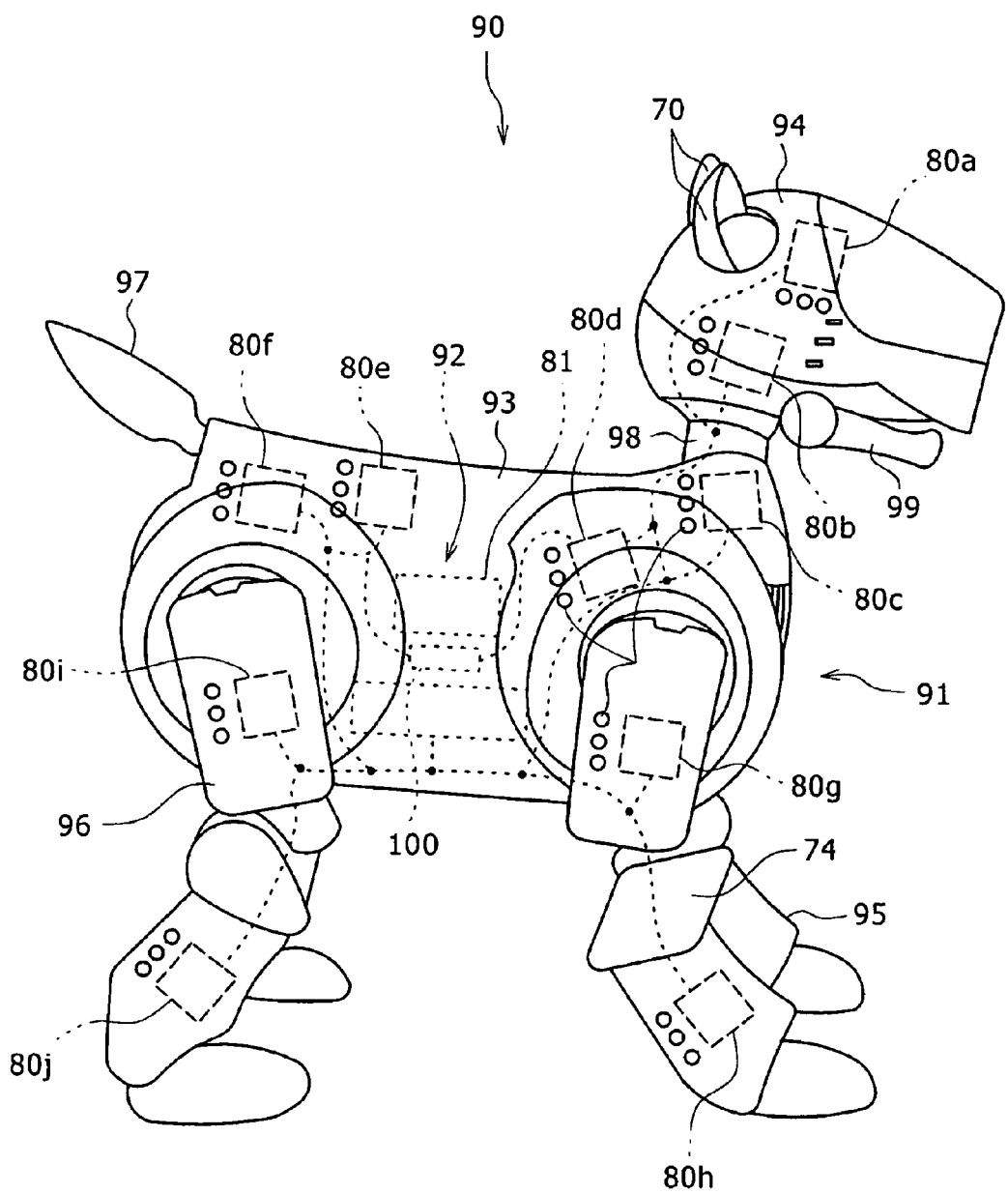
FIG. 4 is a structural diagram of a fuel cell mount apparatus according to a second embodiment of the present invention, and is a structural diagram of the fuel cell mount apparatus in which a fuel cell system is mounted on a dog type robot.

Now, referring to FIG. 4, another embodiment of the fuel cell mount apparatus according to the present invention will be described below. Incidentally, the structures of the fuel cell mount apparatus 90 and the power generation unit 80 constituting the fuel cell mount apparatus according to this embodiment are substantially the same as the fuel cell mount apparatus 20 and the power generation unit 40 described in the first embodiment, and, therefore, detailed description thereof will be omitted. In addition, the power generation unit in the fuel cell system 92 mounted on the fuel cell mount apparatus 90 according to this embodiment is not limited to the power generation unit having a stack structure obtained by laminating a plurality of MEAs. For example, the individual power generation devices constituting a stack structure may be laid out dispersely, and a set of the power generation devices constituted of a plurality of power generation devices may be used as a power generation unit. The fuel cell mount apparatus 90 according to this embodiment is composed of a dog type robot 91 functioning primarily as an electronic apparatus, a fuel cell system 92 composed of a plurality of power generation units 80a to 80j laid out in the inside of the dog type robot, and a secondary cell 100 for supplying electric power to a fuel cell control unit 81 for controlling the operation of the fuel cell system 92. Incidentally, in this embodiment, a fuel cell control unit 81 in the fuel cell system 92 and a control unit in the dog type robot 91 are used as a common part used in common for both the fuel cell system 92 and the dog type robot 91. Incidentally, the common part used in common for both the fuel cell system 92 and the dog type robot 91 may be any one that can be used in common, for example, an auxiliary apparatus or the like such as a cooling fan, a pump and a cooler for cooling the control unit and other heat generating sources, an auxiliary apparatus such as a heater and an electric heater used for heating a fuel supply means for supplying a fuel to the power generation units 40, an air supply means for supplying air to the power generation units, or the like, a temperature sensor, a humidity sensor, a radiator, a DC/DC converter, etc. In addition, a structural member of the fuel cell mount apparatus such as a casing for containing the electronic apparatus and the fuel cell therein may be used as the common part, and, where a wall surface portion of the casing is utilized to clamp the power generation units of the fuel cell, the wall surface portion may be adopted as the common part. Further, a fastening member for the power generation units having a stack structure may naturally be adopted as the common part.

The dog type robot 91 is configured in substantially the same manner as the dog type robot 21 described in the first embodiment above, and is composed principally of movable portions such as a body portion 93, a head portion 94, a neck portion 98, a chin portion 99, ear portions 70, two fore-leg portions 95, two hind-leg portion 96, and a tail portion 97, and a plurality of joint portions for freely moving the movable portions.

The plurality of joint portions are drive portions for moving the movable portions, and are each driven, for example, by a drive motor. Incidentally, the joint portion includes the drive motor for moving the joint portion. The joint portion is rotated or is lowered and raised by a drive force generated in the drive motor, is capable of freely rotating or lowering and raising the movable portion connected to the joint. For example, the pair of fore-leg portions 25 can be turned freely and be lowered and raised freely by the pair of fore-leg joints. In addition, a required number of drive motors can be provided at each joint portion.

The power generation units 80a to 80j are laid out respectively in the vicinity of the joints of the dog type robot 91, and the power generation units 80a to 80j supply electric power to the drive motors located respectively in the vicinity of the power generation units. For example, the power generation unit 80h disposed in the vicinity of a fore-knee joint 74 supplies electric power to the drive motor possessed by the fore-knee joint 74. Like the power generation unit 80h provided in the vicinity of the fore-knee joint 74, the power generation units disposed in the vicinity of the joints supply electric power to the drive motors possessed by the relevant joints, respectively. Thus, the power generation units 80a to 80j constituting the fuel cells are dispersely laid out in the dog type robot 91 functioning as an electronic apparatus, and each power generation unit 80 supplies electric power to the drive motor possessed by the relevant joint, whereby the burden as to the output of each of the power generation units 80a to 80j can be alleviated. It is to be noted that, in the dog type robot 91, although the power generation units 80 are disposed in the vicinity of the respective joints, the number of the power generation units 80 need not necessarily be the same as that of the joints.

Incidentally, it suffices that the plurality of power generation units are in charge of power supply to the plurality of drive motors; for example, one power generation unit of the plurality of power generation units may supply electric power to a plurality of drive motors. Further, the structure in which the power generation units are incorporated in the electronic apparatus is not limitative, and a power generation unit may be externally mounted for compensating for a deficiency in the electric power supplied to the drive units.

According to the fuel cell mount apparatus 90 composed of the dog type robot 91 and the fuel cell system 92 composed of the plurality of power generation units 80a to 80j, the output necessary per one power generation unit can be reduced, as compared with the case where all the drive motors possessed by a dog type robot used as an electronic apparatus are supplied with electric power from one power generation unit. By reducing the output of each of the power generation units 80a to 80j, it is possible to reduce the amount of heat and the amount of water generated upon the power generating reaction in each power generation unit. Therefore, the management of heat and water generated upon the power generating reaction is facilitated, so that it is possible to cause the power generation units to generate electric power in an optimum environment while controlling the temperatures of the power generation units and the amounts of water contained in the power generation cells in the power generation units, and to cause the dog type robot 91 as an electronic apparatus to operate stably.

Furthermore, since the dog type robot 91 has the power generation units 80a to 80j disposed dispersely therein, it is possible to individually replace each of the power generation units, and to perform maintenance of the dog type robot 91 easily by only replacing the power generation unit in which a trouble has occurred. In addition, in the case where all the drive motors are supplied with electric power from one power generation unit, a trouble in the power generation unit may lead to troubles in the driving of all the drive motors. On the other hand, according to the plurality of power generation units 80a to 80j disposed dispersely in the inside of the dog type robot 91, even if one of the power generation units is troubled, a trouble would be generated only in the drive motor supplied with electric power from the troubled power generation unit, and the other drive motors are driven without any trouble. Furthermore, when a specific power generation unit is troubled, it is possible to replace only the troubled power generation unit, and maintenance of the dog type robot 91 can be carried out easily. In addition, maintenance can be performed by replacing the movable part incorporating the troubled power generation unit, of the movable parts of the dog type robot.

An electronic apparatus control unit composed of a microcomputer, storage devices (RAM, ROM) and the like for controlling the driving of all the drive motors, various sensors, a voice recognition device and other mechanisms is incorporated in the body portion 93. The electronic apparatus control unit is a control unit which is incorporated in the dog type robot, like the above-mentioned drive motors, and is driven so as to perform processing of data and commands, thereby controlling the motions of the dog type robot functioning as an electronic apparatus. Incidentally, the fuel cell mount apparatus 90 according to this embodiment uses in common the control unit 81 for controlling the operation of the fuel cell system 92 and the electronic apparatus control unit, and, therefore, the electronic apparatus control unit is not shown in the figure. In addition, where the fuel cell control unit and the electronic apparatus control unit are not used in common, the fuel cell control unit can be driven by electric power supplied from the fuel cells.

The control unit 81 used in common together with the electronic apparatus control unit is a control unit for the dog type robot and, simultaneously, is a drive unit which is driven by electric power in the same manner as the drive motors contained in the joint portions described above. The control unit 81 is driven by being supplied with electric power from a secondary cell 100 such as a lithium ion secondary cell provided in the vicinity of the control unit 81. In other words, the drive units possessed by the electronic apparatus such as the dog type robot 91 in this embodiment are classified into drive units such as joint portions moved by the drive motors and drive units such as the electronic apparatus control unit used in common together with the control unit 81. Comparing the load variation in the drive motors with the load variation in the control unit 81, generally, the load variation in the control unit 81 including the microcomputer tends to be larger than the load variations in the drive motors. Specifically, in the drive unit such as the drive motor, there is little load variation after the electric power necessary for starting the driving is supplied. In other words, in a diagram in which the time of driving of the drive motor is taken on the axis of abscissas and the magnitude of load is taken on the axis of ordinates, the magnitude of load varies in a roughly rectangular shape with reference to the time axis.

On the other hand, the magnitude of the load on the control unit 81 tends to vary in a pulse form with reference to the drive time. Specifically, the load on the control unit 81 not only is large in variation width but also rises steeply and falls steeply with reference to the time axis. The pulse-like load variation causes the electric power necessary for driving the control unit 81 to vary largely. In many cases, it is difficult for the power generation unit 80 constituting the fuel cell to supply the required electric power following up to the rapid load variation, so that the control unit 81 may not be driven stably and it may be impossible to stably drive the electronic apparatus. In addition, also where the electronic apparatus control unit is provided separately from the control unit 81, it is difficult to stably drive the electronic apparatus control unit.

In view of this, the fuel cell mount apparatus 90 has a configuration in which not only the plurality of power generation units are in charge of electric power supply but also the power sources for supplying electric power are differently used according to the load variations in the drive units. Particularly, the drive units such as the drive motors are supplied with electric power from the power generation units 80, while the control unit 81 tending to suffer a large load variation is supplied with electric power from the secondary cell 100 which can supply electric power following up to rapid load variations. The secondary cell 100 is an electric power supply means which can accumulate electrical energy by being charged repeatedly; the secondary cell 100 accumulates the electrical energy supplied from the power generation units 80*d*, 80*e*, and supplies the electrical energy as electric power to the control unit 81. By thus differently using the power sources for supplying electric power according to the variations in load, it is possible to stably drive the fuel cell mount apparatus 90 as a whole. Incidentally, the electric power supply means is not limited to the secondary cell 100 but may be a capacitor. Further, the electric power supply means may be a micro-turbine, a cell such as a primary cell and a solar cell, or a combination thereof with a secondary cell. In addition, the burden in supplying electric power may be shared by one power generation unit and a plurality of electric power supply means.

Besides, the electronic apparatus constituting the fuel cell mount apparatus 90 is not limited to the above-described dog type robot 91 but may be any fuel cell mount apparatus in which a fuel cell is used as a power source for, for example, a general-purpose robot apparatus, other robot apparatus and an articulated robot, a notebook type personal computer, a cellular phone, a camera integrated VTR (Video Tape Recorder), or a personal digital assistant (PDA). For example, in the case of such an electronic apparatus as a notebook type personal computer, it suffices that an electronic apparatus control unit including a CPU is supplied with electric power from an electric power supply means such as a secondary cell and a capacitor, whereas a drive device for driving the medium for writing and reading data is supplied with electric power from a power generation unit of a fuel cell. Besides, the fuel cell mount apparatus according to the present invention may naturally be modified, as required, within the scope of the gist of the invention.

Third Embodiment

Figure 5:
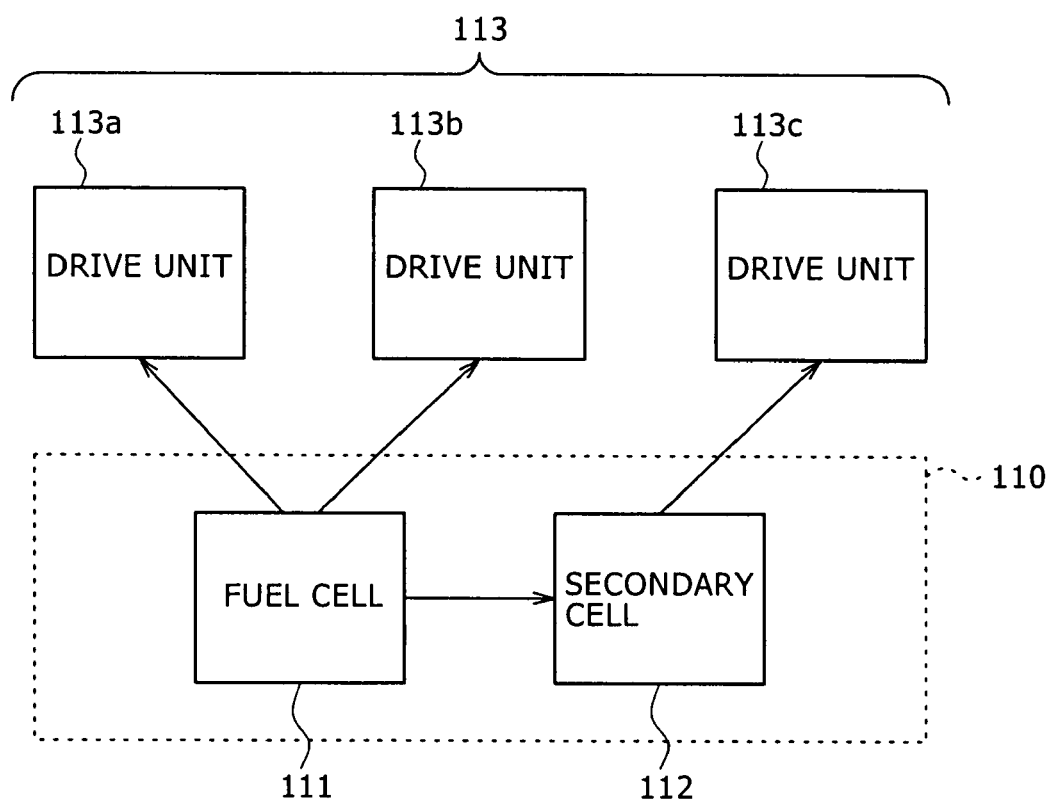
FIG. 5 is a general block diagram of an electric power supply system according to a third embodiment of the present invention.
Figure 6:
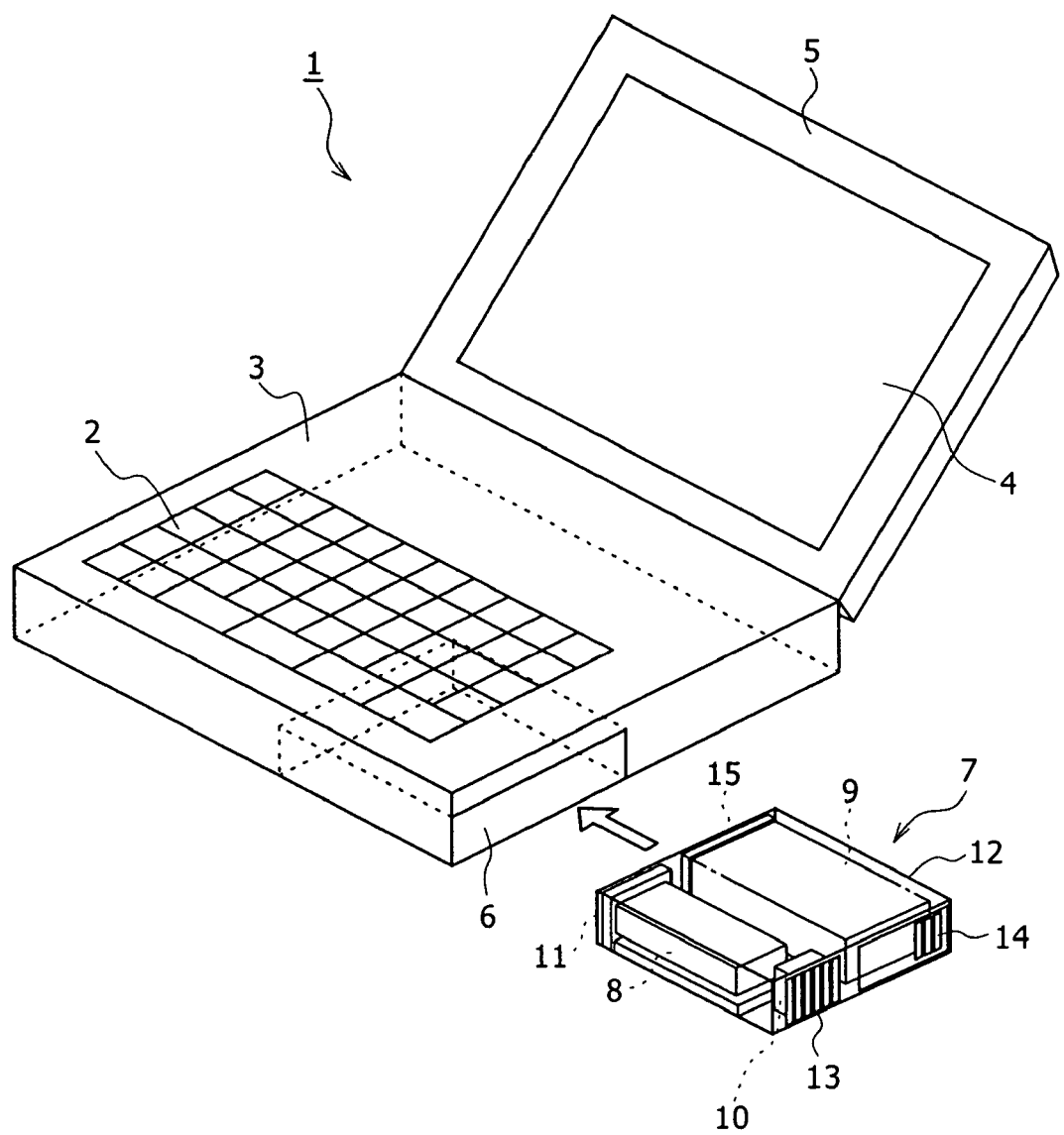
FIG. 6 is illustrates an example of a fuel cell mount apparatus according to the related art.

Now, referring to FIG. 5, an electric power supply system according to the present invention will be described below. FIG. 5 is a block diagram of the electric power supply system 110 according to this embodiment. The electric power supply system 110 includes a fuel cell 111 for supplying electric power to a plurality of drive units 113, and a secondary cell 112 for supplying electric power to a drive unit 113*c* suffering a larger load variation then those on the drive units 113*a*, 113*b* supplied with electric power from the fuel cell 111. For example, in supplying electric power to various electric appliances for home use, the electric appliance suffering a larger load variation than those on the electric appliances supplied with electric power from the fuel cell 111 is supplied with electric power from the secondary cell 112. For example, electric appliances needing a high voltage at the time of turning ON, such as illumination appliances, are supplied with electric power from the secondary cell 112, and other electric appliances suffering small load variations are supplied with electric power from the fuel cell 111. Namely, the drive units 113 correspond to illumination appliances, and the other electric appliances correspond to the drive units 113*a*, 113*b*. In addition, since the secondary cell 112 can be charged from the fuel cell 111 when the various electric appliances are not being driven, the secondary cell 112 functions as an electric power supply means for accumulating electrical energy and thereafter supplying electric power to the drive units required. According to such an electric power supply system 110, the fuel cell and the electric power supply means are differently used for supplying electric power, whereby it is possible to stably supply electric power to a system composed of various drive units differing in load variation.

Besides, the electric power supply system 110 according to this embodiment is not limited to the case of supplying electric power to various electric appliances for home use, and is applicable to the cases of supplying electric power to a system having drive units differing in load variation. For example, in a transport apparatus such as an electric car with a fuel cell mounted thereon, various apparatuses suffering large load variations than that of a drive motor for moving the transport apparatus are supplied with electric power from an electric power supply means such as a secondary cell, whereby it is possible to stably operate the transport apparatus as a whole.

In addition, the electric power supply means is not limited to the secondary cell but may be a capacitor. Besides, the electric power supply means may be a micro-turbine, a cell such as a primary cell and a solar cell, or a combination thereof with a secondary cell.

According to the fuel cell mount apparatus of the present invention, the fuel cell mount apparatus including a fuel cell and an electronic apparatus is so configured that a component element constituting a part of the fuel cell is used in common together with a component element of the electronic apparatus on which the fuel cell is mounted, so that it is possible to remove the wastefulness of the component parts used, and to contrive a simplification in structure, a reduction in size, a reduction in weight, and the like, of the apparatus as a whole. In such a fuel cell mount apparatus, an auxiliary apparatus such as a fan and a pump, or a microcomputer in a control unit or the like can be applied as the component part used in common between the fuel cell and the electronic apparatus, whereby it is possible to contrive a reduction in the number of this kind of component parts.

In addition, the electronic apparatus included in the fuel cell mount apparatus has a plurality of drive units, and, further, the fuel cell has a plurality of power generation units, and the plurality of power generation units can be in charge of power supply to the plurality of drive units. Therefore, it is possible to reduce the output of each power generation unit, to reduce the power generation burden on each power generation unit, and to facilitate heat management and water management. Furthermore, such a fuel cell mount apparatus may further include an electric power supply means for accumulating electrical energy, and the electric power supply means may supply electric power to a predetermined one or ones of the plurality of drive units, whereby electric power can be stably supplied to the drive units differing in load variation. In addition, according to the fuel cell mount apparatus of the present invention, it is possible to reduce the output of each power generation unit, to alleviate the power generation burden on each power generation unit, and to further facilitate heat management and water management. Furthermore, the plurality of power generation units can be in charge of power supply to the plurality of drive units, whereby the burden on the power generation units can be alleviated.

Besides, according to the fuel cell mount apparatus in another mode of the present invention, the burden in supplying electric power to drive units is shared by a plurality of power generation units, whereby it is possible to reduce the output of each power generation unit, and to alleviate the power generation burden on each power generation unit. By thus reducing the burden on each power generation unit, it is possible to easily control or manage the temperature and water in each power generation unit, and to stably generate electric power. Further, according to such a fuel cell mount apparatus, it is possible to stably supply electric power to drive units differing in load variation.

Further, according to the fuel cell mount apparatus in a further mode of the present invention, even in the case where the output of a power generation unit in a fuel cell does not follow up to a load variation in a drive unit, the drive unit can be supplied with electric power from an electric power supply means, whereby the electronic apparatus can be driven stably.

Furthermore, according to the electric power supply system in yet another mode of the present invention, a drive unit suffering a larger load variation than those at other drive units is supplied with electric power from an electric power supply means capable of following up to the relevant load variation, whereby it is possible to cope with the load variation which is difficult to follow up by power supply from a fuel cell, and to supply electric power in a stable manner.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A fuel cell mount apparatus comprising:
a fuel cell capable of power generation by use of a fuel and air, said fuel cell having a plurality of power generation sections;
an electronic apparatus having said fuel cell mounted thereon and being operated by electric power outputted from said fuel cell, said electronic apparatus having a plurality of drive sections that require electric power;
a common part used in common for said fuel cell and said electronic apparatus; and
an electric power supply means for supplying electric power to a predetermined drive section of said plurality of drive sections,
wherein said electric power supply means supplies electric power to said predetermined drive section, and each of the plurality of power generation sections generate and individually supply electric power to respective drive sections of said plurality of drive sections but not to the predetermined drive section, and
wherein said predetermined drive section has a larger load variation than the drive sections supplied with electric power by the plurality of generation sections.

2. A fuel cell mount apparatus as set forth in claim 1, wherein said common part is a component element of said fuel cell and a component element of said electronic apparatus.

3. A fuel cell mount apparatus as set forth in claim 1, wherein said electric power supply means is selected from the group consisting of a primary cell, a secondary cell, a capacitor, a micro-turbine, or a combination thereof.

4. A fuel cell mount apparatus as set forth in claim 1, wherein said power generation sections are identical in number to said plurality of drive sections, said power generation sections are disposed respectively in proximity of said drive sections, and said drive sections are supplied with electric power respectively from corresponding power generation sections.

5. The fuel cell mount apparatus of claim 1, wherein the drive sections include respective joint portions and drive motors, and wherein the drive motors are individually mounted respectively to each of the joint portions such that the joint members are capable of being turned, lowered or raised.

6. The fuel cell mount apparatus of claim 5, wherein the electronic apparatus is a dog robot.

7. The fuel cell mount apparatus of claim 1, wherein the plurality of power generation sections are dispersed throughout the electronic apparatus.

8. The fuel cell mount apparatus of claim 7, wherein each of the plurality of power generation sections includes a plurality of power generation devices, the power generation devices having a stack structure.

9. The fuel cell mount apparatus of claim 1, wherein the common part is the same as the predetermined drive section that is supplied power from the electric power supply means.

10. The fuel cell mount apparatus of claim 1, wherein the common part and the predetermined drive section are both a control unit commonly used by the fuel cell and the electronic apparatus, wherein the electric power supply means supplies power to the control unit.

11. The fuel cell mount apparatus of claim 1, wherein said common part is selected from the group consisting of a fan, a pump or a cooler used for one or more of the power generation sections or a control section of said fuel cell, an auxiliary apparatus including a heater and an electric heater used for heating a fuel supply means for supplying said fuel to one or more of the power generation sections of said fuel cell, an air supply means for supplying air to one or more of the power generation sections, a temperature sensor, a humidity sensor, a radiator, a structural member, a fastening member, and said control section.

12. A fuel cell mount apparatus as set forth in claim 1, wherein each of the plurality of power generation sections are electrically connected to respective drive sections of said plurality of drive sections.

* * * * *